US011073883B2

(12) United States Patent
Sato et al.

(10) Patent No.: US 11,073,883 B2
(45) Date of Patent: Jul. 27, 2021

(54) SERVER APPARATUS, MONITORING CONTROL APPARATUS, AND STORAGE MEDIUM

(71) Applicant: FUJITSU LIMITED, Kawasaki (JP)

(72) Inventors: Tomohiko Sato, Fujisawa (JP); Tomoki Yamada, Chofu (JP); Shimuya Kobayashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 127 days.

(21) Appl. No.: 16/459,664

(22) Filed: Jul. 2, 2019

(65) Prior Publication Data

US 2020/0012328 A1 Jan. 9, 2020

(30) Foreign Application Priority Data

Jul. 4, 2018 (JP) ............................ JP2018-127264

(51) Int. Cl.
*G06F 1/30* (2006.01)
*G06F 3/06* (2006.01)

(52) U.S. Cl.
CPC .............. *G06F 1/30* (2013.01); *G06F 3/0604* (2013.01); *G06F 3/0659* (2013.01); *G06F 3/0673* (2013.01)

(58) Field of Classification Search
CPC .... G06F 3/0604; G06F 3/0659; G06F 3/0673; G06F 1/30
See application file for complete search history.

(56) References Cited

U.S. PATENT DOCUMENTS 5,546,591 A * 8/1996 Wurzburg ............. G06F 1/3281 713/322
5,628,029 A * 5/1997 Evoy .................. G06F 11/3485 710/18
7,372,682 B2 * 5/2008 Chapuis .................... G06F 1/26 361/18
9,625,974 B2 * 4/2017 Bailey ................... G06F 1/3234
10,097,572 B1 * 10/2018 Sohail ................... G06F 3/0637
2002/0053039 A1 * 5/2002 Inoue .................... G06F 1/3203 713/323
2017/0031409 A1 * 2/2017 Lester .................. G06F 3/0617

FOREIGN PATENT DOCUMENTS

JP 2012-173926 9/2012
JP 2016-167213 9/2016

* cited by examiner

*Primary Examiner* — Nimesh G Patel
(74) *Attorney, Agent, or Firm* — Fujitsu Patent Center

(57) ABSTRACT

A server apparatus includes a plurality of nodes; a plurality of power supply devices configured to supply power; and a shared memory from and to which reading and writing from each of the plurality of nodes are performed, wherein each of the plurality of nodes includes a processor configured to: store power consumption information of an own node in the memory; read the power consumption information from the memory when an abnormality is detected in some power supply devices among the plurality of power supply devices; and control supply power from a normal power supply device, in which an abnormality is not detected among the plurality of power supply devices, to the own node, based on the read power consumption information.

9 Claims, 9 Drawing Sheets

1
HOUSING
2
PSU#0
20-1
PSU#1
20-2
146
HOUSING STORAGE AREA
30
FAN OR LIKE
40
147
NODE #0
10-1
NODE #1
10-2
NODE #2
10-3
NODE #3
10-4
POWER MONITORING UNIT
101
POWER CONTROLLER
102
POWER RECORDING UNIT
103
BMC
14

(a)
HOUSING
2
PSU #0 1000W
20-1
PSU #1 1000W
20-2
FAN OR LIKE 200W
40
RATIO 1 : 1 : 4 : 0
NODE #0 250W
10-1
NODE #1 250W
10-2
NODE #2 1000W
10-3
NODE #3 0W
10-4
MALFUNCTION IN PSU #1 (SUPPLIABLE POWER DECREASES FROM 2000 W TO 1000 W)
(b)
HOUSING
2
PSU #0 1000W
20-1
20-2
FAN OR LIKE 200W
40
RATIO 1 : 1 : 4 : 0
NODE #0 133W
10-1
NODE #1 133W
10-2
NODE #2 533W
10-3
NODE #3 0W
10-4

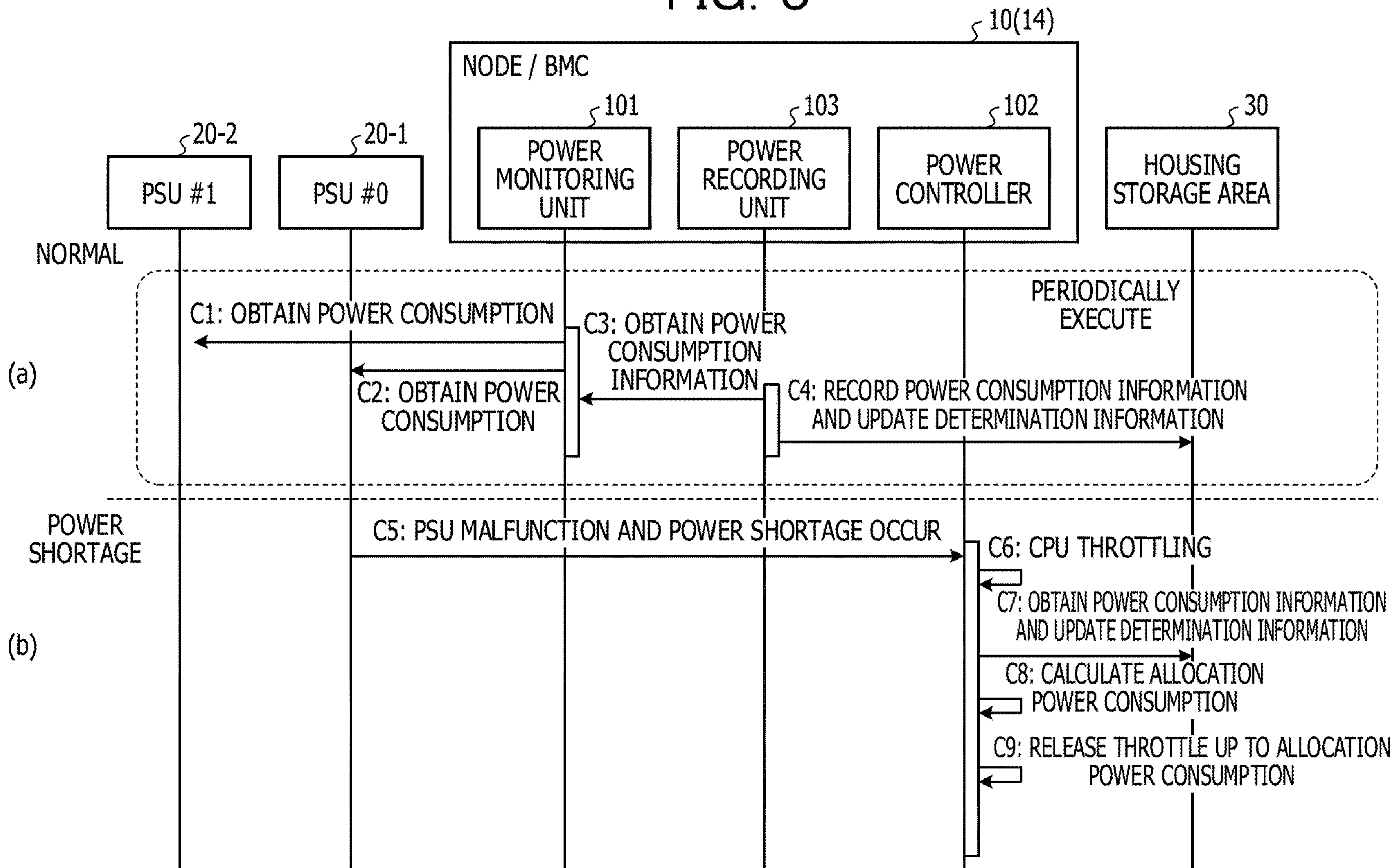
FIG. 5
10(14)
NODE / BMC
20-2
PSU #1
20-1
PSU #0
101
POWER MONITORING UNIT
103
POWER RECORDING UNIT
102
POWER CONTROLLER
30
HOUSING STORAGE AREA
NORMAL
(a)
PERIODICALLY EXECUTE
C1: OBTAIN POWER CONSUMPTION
C2: OBTAIN POWER CONSUMPTION
C3: OBTAIN POWER CONSUMPTION INFORMATION
C4: RECORD POWER CONSUMPTION INFORMATION AND UPDATE DETERMINATION INFORMATION
POWER SHORTAGE
(b)
C5: PSU MALFUNCTION AND POWER SHORTAGE OCCUR
C6: CPU THROTTLING
C7: OBTAIN POWER CONSUMPTION INFORMATION AND UPDATE DETERMINATION INFORMATION
C8: CALCULATE ALLOCATION POWER CONSUMPTION
C9: RELEASE THROTTLE UP TO ALLOCATION POWER CONSUMPTION

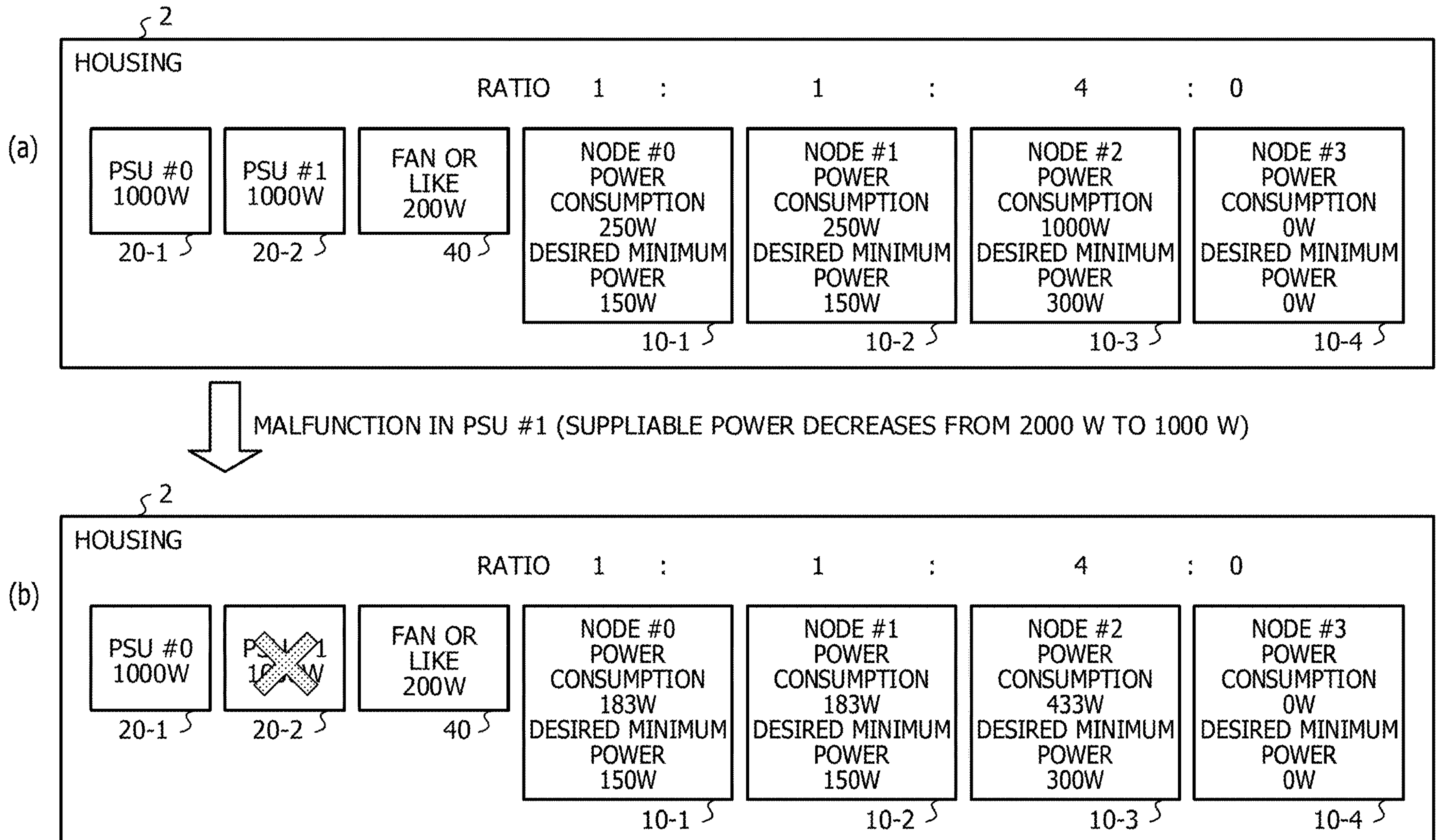
FIG. 6
(a)
2
HOUSING
RATIO 1 : 1 : 4 : 0
PSU #0 1000W
20-1
PSU #1 1000W
20-2
FAN OR LIKE 200W
40
NODE #0 POWER CONSUMPTION 250W DESIRED MINIMUM POWER 150W
10-1
NODE #1 POWER CONSUMPTION 250W DESIRED MINIMUM POWER 150W
10-2
NODE #2 POWER CONSUMPTION 1000W DESIRED MINIMUM POWER 300W
10-3
NODE #3 POWER CONSUMPTION 0W DESIRED MINIMUM POWER 0W
10-4
MALFUNCTION IN PSU #1 (SUPPLIABLE POWER DECREASES FROM 2000 W TO 1000 W)
(b)
2
HOUSING
RATIO 1 : 1 : 4 : 0
PSU #0 1000W
20-1
20-2
FAN OR LIKE 200W
40
NODE #0 POWER CONSUMPTION 183W DESIRED MINIMUM POWER 150W
10-1
NODE #1 POWER CONSUMPTION 183W DESIRED MINIMUM POWER 150W
10-2
NODE #2 POWER CONSUMPTION 433W DESIRED MINIMUM POWER 300W
10-3
NODE #3 POWER CONSUMPTION 0W DESIRED MINIMUM POWER 0W
10-4

PSU #00
PSU #01
NODE #00
POWER CONTROLLER
NODE #01
POWER CONTROLLER
NODE #02
POWER CONTROLLER
NODE #03
POWER CONTROLLER
B1
PSU MALFUNCTION AND POWER SHORTAGE OCCUR
CPU THROTTLING
B2
RELEASE THROTTLE UP TO ALLOCATION POWER CONSUMPTION
B3
B4
POWER SHORTAGE OCCURS AGAIN
REPETITION
CPU THROTTLING
B5
RELEASE THROTTLE UP TO ALLOCATION POWER CONSUMPTION
B6

SERVER APPARATUS, MONITORING CONTROL APPARATUS, AND STORAGE MEDIUM

CROSS-REFERENCE TO RELATED APPLICATION

This application is based upon and claims the benefit of priority of the prior Japanese Patent Application No. 2018-127264, filed on Jul. 4, 2018, the entire contents of which are incorporated herein by reference.

FIELD

The embodiments discussed herein are related to a server apparatus, a monitoring control apparatus, and a storage medium.

BACKGROUND

In a general server system, when power consumption exceeds suppliable power due to malfunction or the like in some of power supply devices (power supply units: PSUs), there is known a method of reducing supply power form remaining PSUs by temporarily dropping a central processing unit (CPU) clock to a minimum level.

In this manner, by reducing the supply power of the PSU, it is possible to suppress the remaining PSU from supplying power exceeding suppliable power and to suppress malfunction of the PSU as a result.

As a server system, a multi-node server including a plurality of nodes in a housing is known.

In the multi-node server, a management apparatus (hereinafter, referred to as a chassis manager) which manages the entire system is provided, and the chassis manager controls power supply of each of nodes so as not to exceed suppliable power from a PSU.

FIG. 7 is a diagram illustrating transition of power consumption in a multi-node server in the related art. In FIG. 7, a vertical axis represents power consumption in the server, and a horizontal axis represents an elapsed time.

When a power shortage occurs due to PSU malfunction or the like and suppliable power from a remaining PSU is exceeded (see arrow A1), a CPU clock of a power controller of a baseboard management controller (BMC) in each of nodes is dropped to a minimum level and power consumption is suppressed (see arrow A2). The BMC is a monitoring apparatus which monitors a state of hardware in a node (a node of the BMC) on which the BMC is mounted.

The chassis manager notifies the BMC in each of the nodes of an upper limit of the power consumption. The power controller of the BMC in each of the nodes gradually increases the power consumption by gradually releasing a throttle of a CPU (see arrow A3). During this time, power recovery is attempted within the suppliable power from the remaining PSU.

The chassis manager checks power consumption of the entire multi-node server. If it is determined that the power consumption is likely to exceed the suppliable power from the PSU, the chassis manager stops releasing the throttle (see arrow A4), so that power consumption of the node becomes the suppliable power from the PSU.

On the other hand, a server system without a chassis manager is also used for the purpose of reducing a development cost and a manufacturing cost. In the multi-node server without the chassis manager, as a function of a power controller of a BMC in each of nodes included in the multi-node server, power control is performed in each of the nodes. As related arts, for example, Japanese Laid-open Patent Publication No. 2012-173926, Japanese Laid-open Patent Publication No. 2016-167213, and the like are disclosed.

FIG. 8 is a sequence diagram illustrating a process when PSU malfunction occurs in a multi-node server without a chassis manager in the related art.

The multi-node server without the chassis manager in the related art illustrated in FIG. 8 includes two PSUs #00 and #01 and four nodes #00 to #03.

In the multi-node server without the chassis manager, for example, if malfunction occurs in the PSU #00 (see arrow B1), the PSU #01 notifies each of the nodes #00 to #03 of occurrence of a power shortage.

In each of the nodes #00 to #03 receiving the notification, a power controller of a BMC drops a clock of a CPU in a node of the BMC to a minimum level so as to suppress power consumption (throttling: see arrow B2).

Thereafter, the power controller of the BMC in each of the nodes gradually releases a throttle of the CPU in the own node so as to gradually increase the power consumption (ramp up: see arrow B3). For example, in the remaining PSU #01, power recovery is attempted within suppliable power.

By increasing power consumption in each of the nodes, a total value of power consumptions of all of the nodes exceeds the suppliable power from the PSU, and a shortage of supply power from the remaining PSU #01 occurs (arrow B4).

Therefore, the same process is repeatedly performed in each of the nodes. For example, the PSU #01 notifies each of the nodes #00 to #03 of the occurrence of a power shortage.

In each of the nodes #00 to #03 receiving the notification, the power controller of the BMC drops the clock of the CPU in the node of the BMC to a minimum level so as to suppress power consumption (throttling: see arrow B5).

Thereafter, the power controller of the BMC in each of the nodes gradually releases the throttle of the CPU in the own node so as to gradually increase power consumption (see arrow B6). For example, in the remaining PSU #01, power recovery is attempted within suppliable power.

In each of the nodes, by increasing power consumption without considering power consumption of other nodes, the total value of the power consumptions of all of the nodes exceeds the suppliable power from the PSU, and a shortage of supply power from the remaining PSU #01 occurs.

FIG. 9 is a diagram illustrating transition of power consumption in the multi-node server without the chassis manager in the related art illustrated in FIG. 8.

As illustrated in FIG. 9, in the multi-node server without the chassis manager in the related art, occurrence of over-suppliable power by a PSU and throttling and ramp-up of a CPU are repeated.

For example, even if the PSU is protected, there is a problem that power consumption of the server repeatedly decreases and increases and processing performance of the server is unstable. In view of the above, it is desirable that stable power control may be realized in a multi-node server without a management apparatus.

SUMMARY

According to an aspect of the embodiments, a server apparatus includes a plurality of nodes; a plurality of power supply devices configured to supply power; and a shared memory from and to which reading and writing from each of the plurality of nodes are performed, wherein each of the plurality of nodes includes a processor configured to: store power consumption information of an own node in the memory; read the power consumption information from the memory when an abnormality is detected in some power supply devices among the plurality of power supply devices; and control supply power from a normal power supply device, in which an abnormality is not detected among the plurality of power supply devices, to the own node, based on the read power consumption information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a sequence diagram for explaining a method of obtaining power in the multi-node server as the example of the first embodiment;

FIG. 6 is a diagram for explaining a method of determining allocable power when malfunction of a PSU occurs in a multi-node server as an example of a second embodiment;

DESCRIPTION OF EMBODIMENTS

Figure 1:
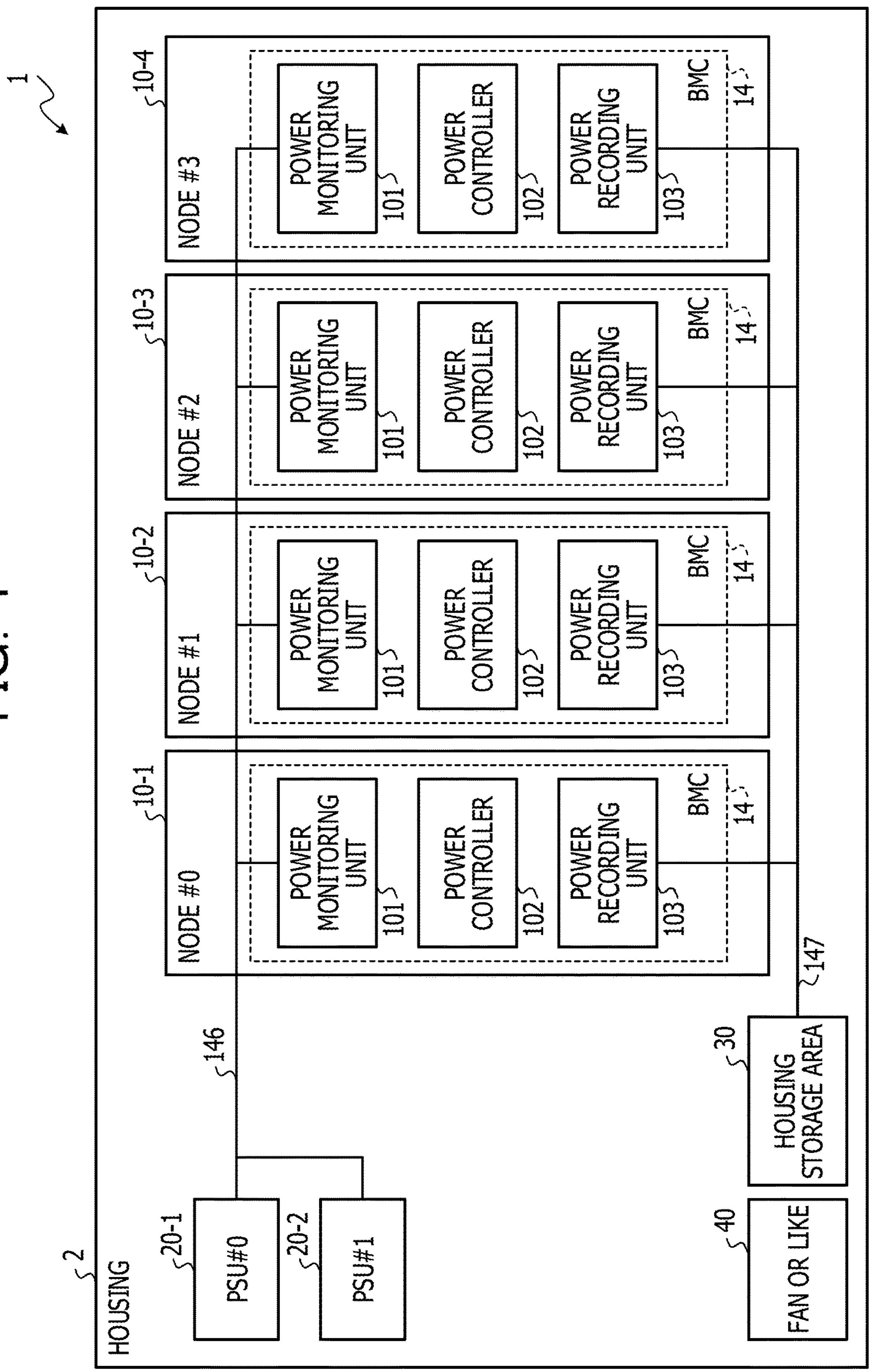
FIG. 1 is a schematic diagram illustrating a configuration of a multi-node server as an example of a first embodiment.

Hereinafter, embodiments according to a server apparatus, a power control program, and a monitoring control apparatus will be described with reference to the drawings. Meanwhile, the embodiments to be described below are merely examples, and there is no intention to exclude an application of various modifications and technologies not described in the embodiments. That is, the present embodiment may be implemented with various modifications (such as a combination of the embodiment and each of the modifications) without departing from the scope of the present embodiment. In addition, each of the drawings is not intended to include only the components illustrated in the drawings, but may include other functions and the like.

(I) Description of First Embodiment

(A) Configuration

Figure 2:
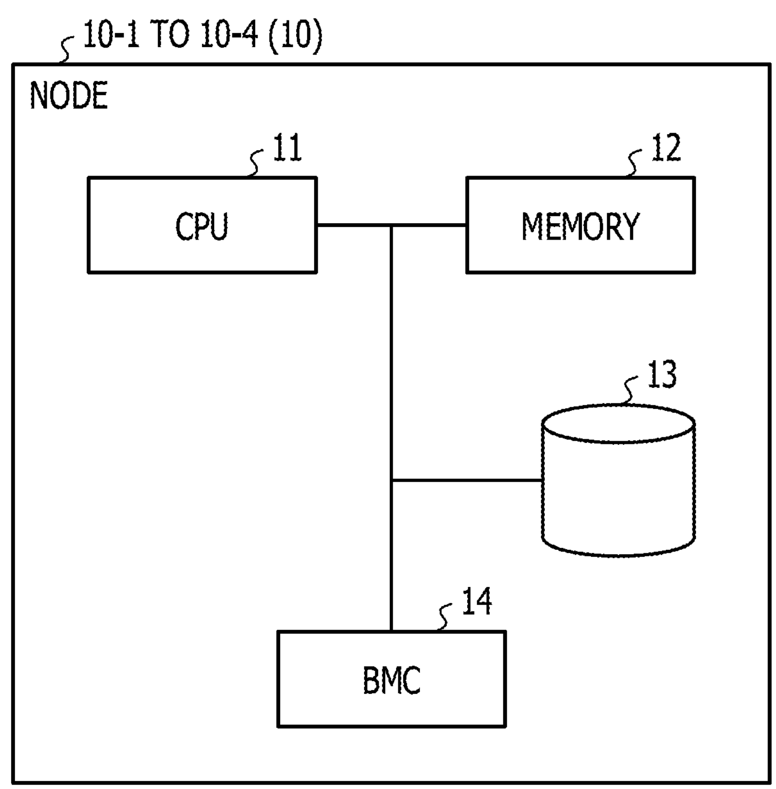
FIG. 2 is a diagram illustrating hardware of a node of the multi-node server as the example of the first embodiment.
Figure 3:
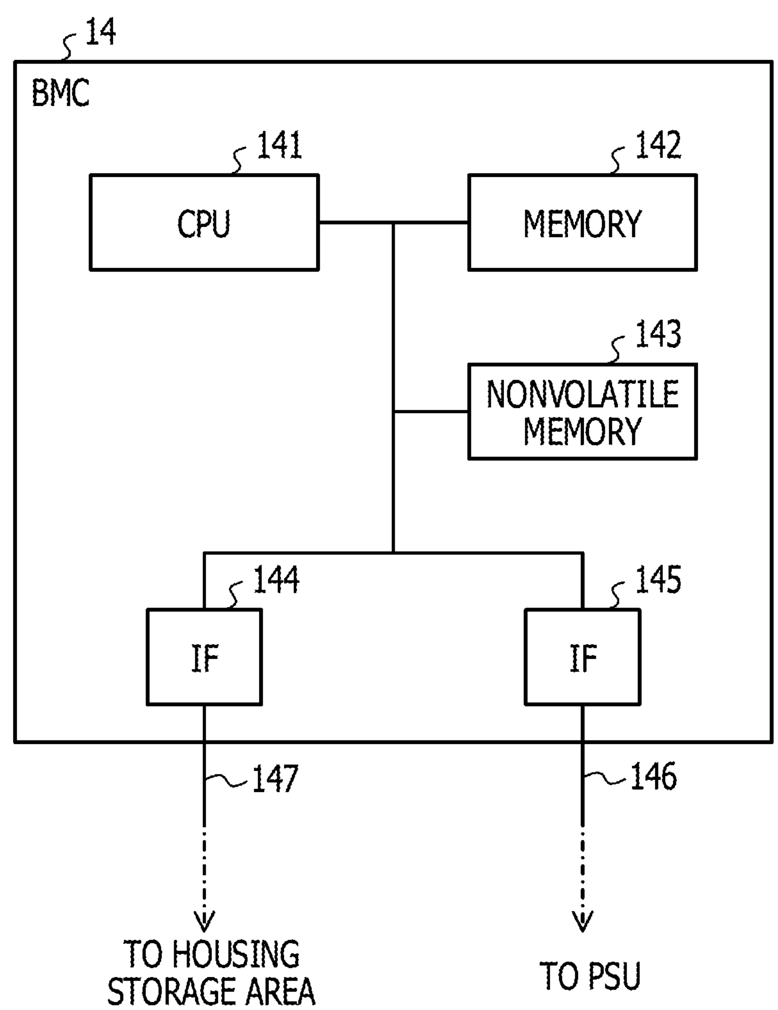
FIG. 3 is a diagram illustrating a hardware configuration of a BMC of the multi-node server as the example of the first embodiment.

FIG. 1 is a schematic diagram illustrating a configuration of a multi-node server 1 as an example of a first embodiment. FIG. 2 is a diagram illustrating hardware of nodes 10-1 to 10-4. FIG. 3 is a diagram illustrating a hardware configuration of a BMC 14.

The multi-node server 1 is a server computer (an information processing apparatus) including a plurality of (four in the example illustrated in FIG. 1) the nodes 10-1 to 10-4 in a housing 2.

Hereinafter, as a reference number indicating a node, reference numbers of 10-1 to 10-4 are used when it is desired to specify one of the plurality of nodes, but a reference number of 10 is used to indicate a predetermined node. Hereinafter, in some cases, the node 10-1 is referred to as a node #0. In the same manner, in some cases, the nodes 10-2, 10-3, and 10-4 are respectively referred to as a node #1, a node #2, and a node #3.

A node 10 is a computer which is a subject of an arithmetic process, and is a component unit in the multi-node server 1. In the multi-node server 1, by increasing or decreasing the number of nodes 10 mounted in the housing 2, processing performance may be changed to predetermined performance. The node 10 may also include a blade computer (a blade server) formed in a thin plate shape and configured to be insertable into and detachable from a housing.

Each of PSUs 20-1 and 20-2 is a power supply device which supplies power to each of units included in the housing 2. Hereinafter, as a reference number indicating a PSU, reference numbers of 20-1 and 20-2 are used when it is desired to specify one of the plurality of PSUs, but a reference number of 20 is used to indicate a predetermined PSU. Hereinafter, in some cases, the PSU 20-1 is referred to as a PSU #0, and the PSU 20-2 is referred to as a PSU #1.

The PSU 20 supplies power to each of the nodes 10, a housing storage area 30, or a FAN or the like 40. In the multi-node server 1, a redundant configuration is realized by providing a plurality of (two in the example illustrated in FIG. 1) PSUs 20.

In a case where the PSU 20 detects an abnormality in the PSU 20, the PSU 20 notifies the BMC 14 in each of the nodes 10 via a communication line 146 of occurrence of the abnormality and information on the abnormality. For example, in a case where the PSU 20 supplies power exceeding a power supply capability of the PSU 20, the PSU 20 notifies each of the nodes 10 of this state.

The FAN or the like 40 is an electronic device operated by power supplied from the PSU 20. For example, a fan, a light emitting diode (LED), or the like, which is an electronic device mounted in the housing 2 and cools a heat source provided in the housing 2, corresponds to the FAN or the like 40. A storage device, a display device, or the like mounted in the housing 2 and shared by a plurality of nodes 10 may be included in the FAN or the like 40.

The housing storage area 30 is a shared storage area which is mounted in the housing 2 and the BMC 14 in each of the nodes 10 may read (refer to) and write data from and to the housing storage area 30. For example, in order to store device-specific information such as a serial number and vendor-specific information, nonvolatile memory or a chassis IDP ROM of a field replacement unit (FRU) device generally mounted on the housing 2 may be used as the housing storage area 30.

The housing storage area 30 is shared by the BMC 14 in each of the nodes 10, and power consumption information is recorded in the housing storage area 30 by a power recording unit 103 of the BMC 14 in each of the nodes 10 as described below.

As illustrated in FIG. 2, the node 10 is an information processing apparatus including each of a CPU 11, a memory 12, a storage device 13, and the BMC 14.

The storage device 13 is a storage device such as a hard disk drive (HDD), a solid state drive (SSD), or a storage class memory (SCM), and stores various data.

The memory 12 is a storage memory including a read only memory (ROM) and a random access memory (RAM). An operating system (OS), various software programs, and program data are written in the ROM of the memory 12. The software program on the memory 12 is appropriately read and executed by the CPU 11. The RAM of the memory 12 is used as a primary storage memory or a working memory.

The CPU 11 is a processing device which performs various control and calculation. The CPU 11 executes various functions by executing the OS and the program stored in the memory 12.

The BMC 14 is a monitoring control apparatus which mainly monitors a state of hardware in a node (own node) 10 on which the BMC 14 is mounted.

As illustrated in FIG. 3, the BMC 14 includes a CPU 141, a memory 142, a nonvolatile memory 143, and interfaces (I/F) 144 and 145.

The interface 144 is a communication interface device connected to the housing storage area 30 via a communication line 147. The BMC 14 writes data to the housing storage area 30 via the interface 144 and reads data from the housing storage area 30. The interface 144 communicates with the housing storage area 30 based on, for example, an inter-integrated circuit (I2C) standard.

The interface 145 is a communication interface device connected to the PSUs 20-1 and 20-2 via the communication line 146. The BMC 14 communicates with the PSUs 20-1 and 20-2 via the interface 145. The interface 145 communicates with the PSU 20 based on, for example, the I2C standard.

The nonvolatile memory 143 is a storage device having a semiconductor storage element, and stores a monitoring control program for realizing a monitoring function of the hardware of the node 10 or various data used for execution of the program. The monitoring control program includes a power control program which controls power supplied to the own node 10.

The memory 142 is used as a main storage device of the BMC 10. In the memory 142, at least a part of an OS and an application program to be executed by the CPU 141 are read from the nonvolatile memory 143 and temporarily stored. The memory 142 stores various data desired for a process by the CPU 141.

The application program on the memory 142 is appropriately read and executed by the CPU 141. The memory 142 is used as a primary storage memory or a working memory.

The CPU 141 is a processing device which performs various control or calculation, and executes various functions by executing the OS and the program stored in the memory 142.

When the CPU 141 executes the monitoring control program, the functions as a power monitoring unit 101, a power controller 102, and the power recording unit 103 illustrated in FIG. 1 are realized.

A program (a power control program), which realizes a function as the power monitoring unit 101, the power controller 102, and the power recording unit 103, is provided in a form of being recorded on a computer readable recording medium, such as a flexible disk, a CD (CD-ROM, CD-R, CD-RW, or the like), a DVD (DVD-ROM, DVD-RAM, DVD-R, DVD+R, DVD-RW, DVD+RW, HD DVD, or the like), a Blu-ray disk, a magnetic disk, an optical disk, a magneto-optical disk and the like. The computer reads the program from the recording medium and transfers, stores, and uses the program in an internal storage device or an external storage device. For example, the program may be recorded in a storage device (a recording medium) such as a magnetic disk, an optical disk, a magneto-optical disk, or the like, and may be provided from the storage device to the computer via a communication path.

When realizing the function as the power monitoring unit 101, the power controller 102, and the power recording unit 103, the program stored in the internal storage device (in the present embodiment, the memory 142 or the nonvolatile memory 143 of the BMC 14) is executed by a microprocessor of the computer (in the present embodiment, the CPU 141 of the BMC 14). At this time, the computer may read and execute the program recorded on the recording medium.

The power monitoring unit 101 obtains power consumption (total power consumption) of the entire housing 2 from the PSU 20. The power monitoring unit 101 obtains power consumption of the own node 10. The power monitoring unit 101 may obtain the power consumption of the own node 10 by the power monitoring unit 101 or may obtain the power consumption from the PSU 20.

The obtainment of the power consumption of the own node 10 in the BMC 14 may be realized by using various known methods, so the description thereof will not be repeated.

Hereinafter, the total power consumption of the housing 2 and the power consumption of the node 10 may be referred to as power consumption information. The power consumption information indicates a power consumption status of the multi-node server 1. For example, hereinafter, in some cases, the power consumption information may be referred to as a power consumption status.

The power recording unit 103 records the power consumption information (the power consumption of the housing 2 and the power consumption of the own node 10) obtained by the power monitoring unit 101 in the housing storage area 30. The power recording unit 103 corresponds to a recording controller.

The power recording unit 103 records power consumption information in the storage area 30 periodically (for example, every one second).

When recording the power consumption information in the housing storage area 30, the power recording unit 103 records update determination information indicating that the power consumption information is updated in the housing storage area 30 together with the power consumption information. The update determination information is recorded in the housing storage area 30 in association with power consumption information.

The update determination information may include, for example, update time information (a time stamp) indicating the date and time when the power recording unit 103 records the power consumption information in the housing storage area 30, and the update time information is stored in the housing storage area 30 in association with power consumption information.

By referring to the update time information, it is possible to grasp the date and time (a time) when the corresponding power consumption information is recorded, and to grasp that the power consumption information is updated by the power recording unit 103.

The update determination information may include error detection information generated based on power consumption information to be recorded in the housing storage area 30. In the multi-node server 1, an example in which a check-sum, which is one type of an error detection code, is used as error detection information. For example, the power recording unit 103 has a function of generating a check-sum based on power consumption information. The checksum may be generated by various known methods, and the description thereof is not repeated. The check-sum is recorded in the housing storage area 30 in association with power consumption information.

For example, by calculating a check-sum based on power consumption information stored in the housing storage area 30 and comparing a value of the calculated check-sum with a check-sum stored in the housing storage area 30, it is possible to grasp that the power consumption information corresponding to the check-sum is an updated value.

An initial value of the housing storage area 30 is an undefined value. In a case where the value of the check-sum read from the housing storage area 30 does not coincide with the check-sum calculated based on the power consumption information, it is possible to determine that the power consumption information is not updated and remains an initial value.

In the multi-node server 1, the power recording unit 103 of each of the BMCs 14 records power consumption information, update time information, and a checksum in the housing storage area 30. The power recording unit 103 may record the power consumption information, the update time information, and the checksum in a specific storage area in the housing storage area 30 in association with each other.

The power recording unit 103 records the power consumption information, the update time information, and the checksum in the housing storage area 30 only when the own node 10 is in a power-on state (at a time of power-on).

As power consumption of the node 10, the power recording unit 103 may record power consumption immediately before malfunction of the PSU 20 or the like or average power consumption before the malfunction as power consumption information. As power consumption information, the power recording unit 103 may use planned power consumption predicted from the past usage records and the like of the own node 10.

It is desirable that power consumption information and update determination information are recorded in a predetermined area provided for each of the nodes 10 in the housing storage area 30.

In a case where suppliable power by the PSU 20 is insufficient due to malfunction or the like of the PSU 20, the power controller 102 obtains a power consumption status of the housing 2 from the housing storage area 30 and determines power available to the own node 10 within suppliable power to be supplied from the remaining normal PSUs (normal power supply devices) 20.

The power available to the own node 10 within the suppliable power to be supplied from the remaining normal PSU 20 corresponds to allocation power allocated to the own node 10. The power available to the own node 10 within the suppliable power to be supplied from the remaining normal PSU 20 may also be referred to as power consumption which may be consumed by the own node 10.

The power controller 102 controls the PSU 20 and the BMC 14 so that power corresponding to the determined allocation power is supplied to the own node 10. A method of causing the determined allocation power to be supplied to the own node 10 is known, and the description thereof is not repeated.

Figure 4:
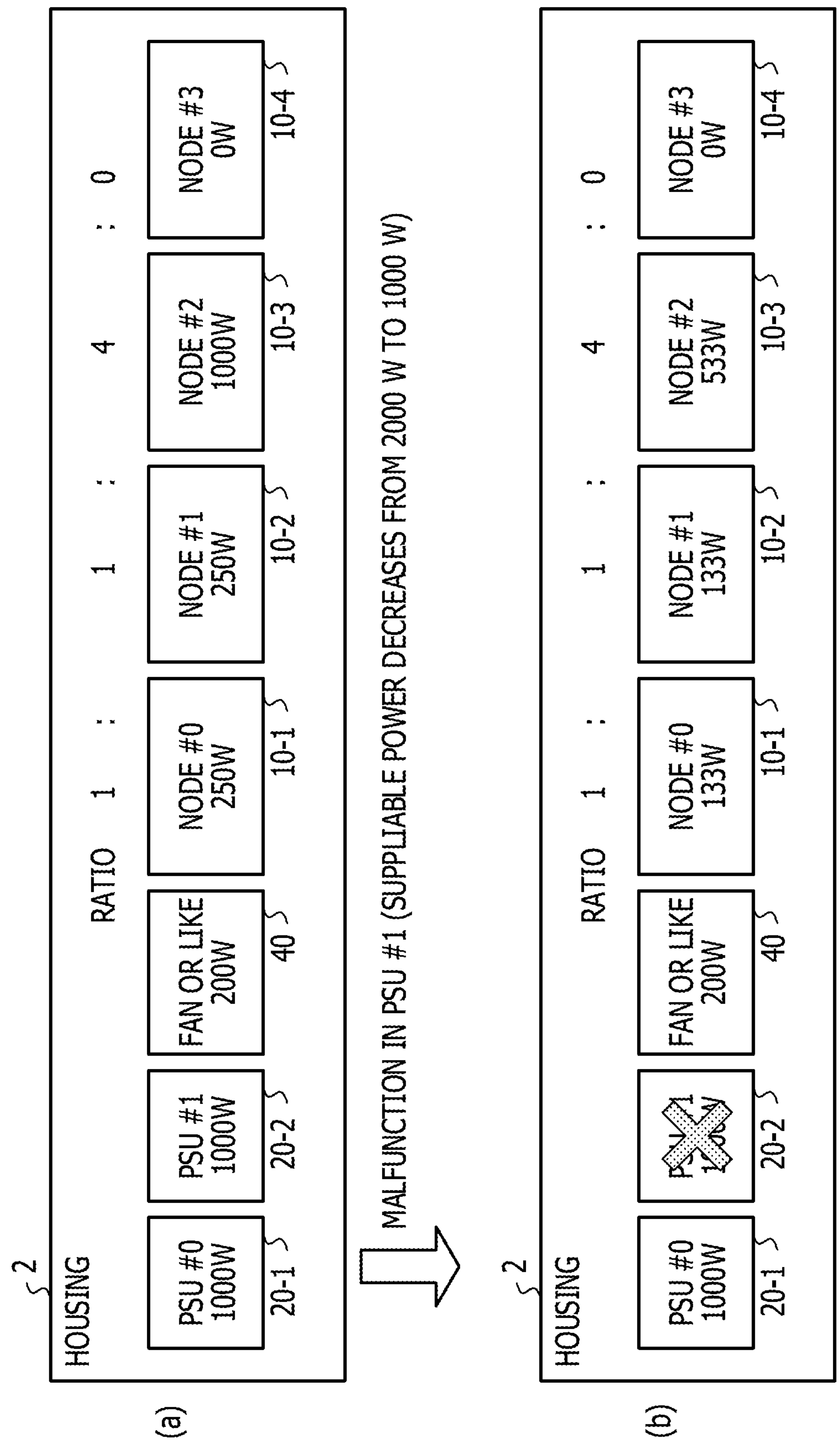
FIG. 4 is a diagram for explaining a method of determining allocable power when malfunction of a PSU occurs in the multi-node server as the example of the first embodiment.
Figure 7:
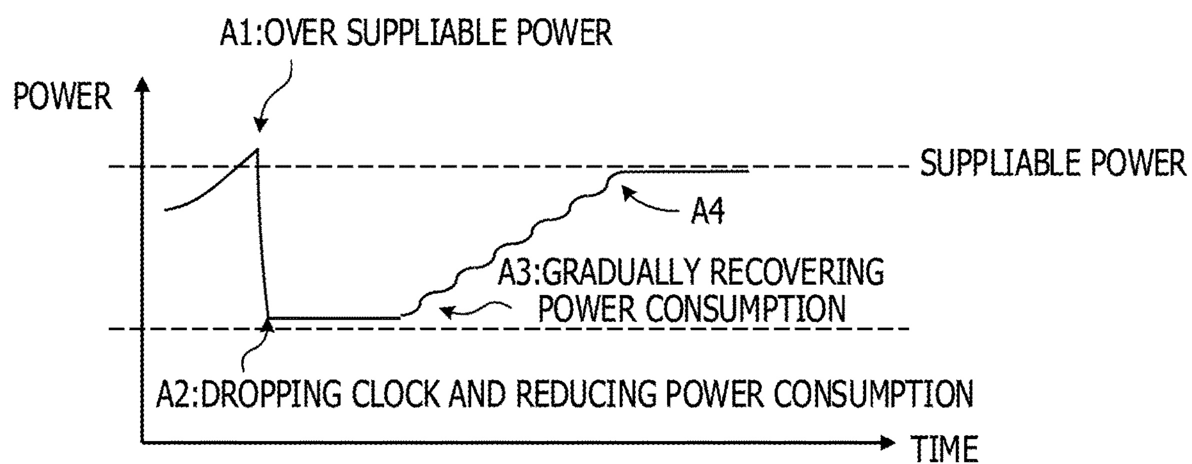
FIG. 7 is a diagram illustrating transition of power consumption in a multi-node server in the related art.
Figure 8:
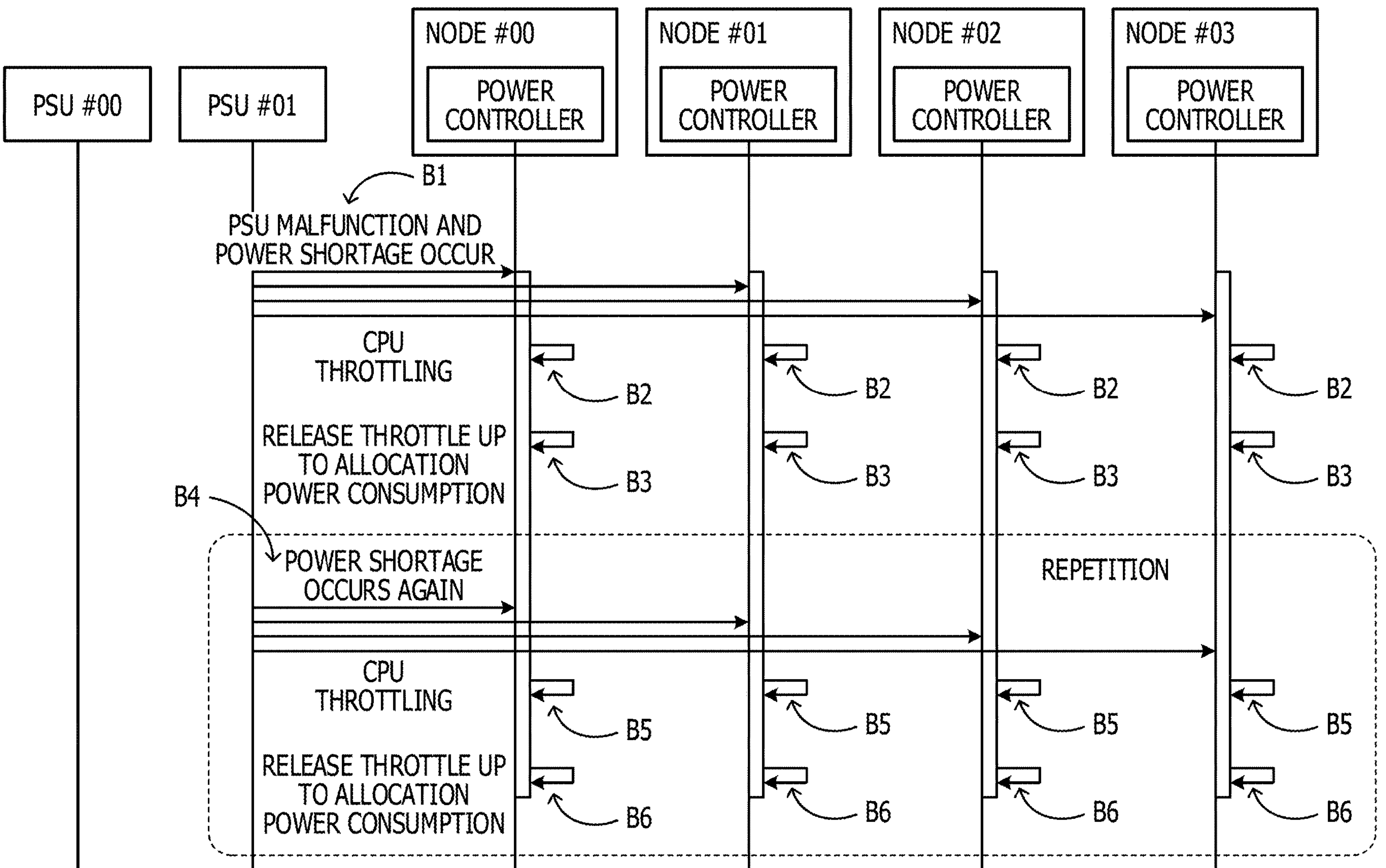
FIG. 8 is a sequence diagram illustrating a process when PSU malfunction occurs in a multi-node server without a chassis manager in the related art.
Figure 9:
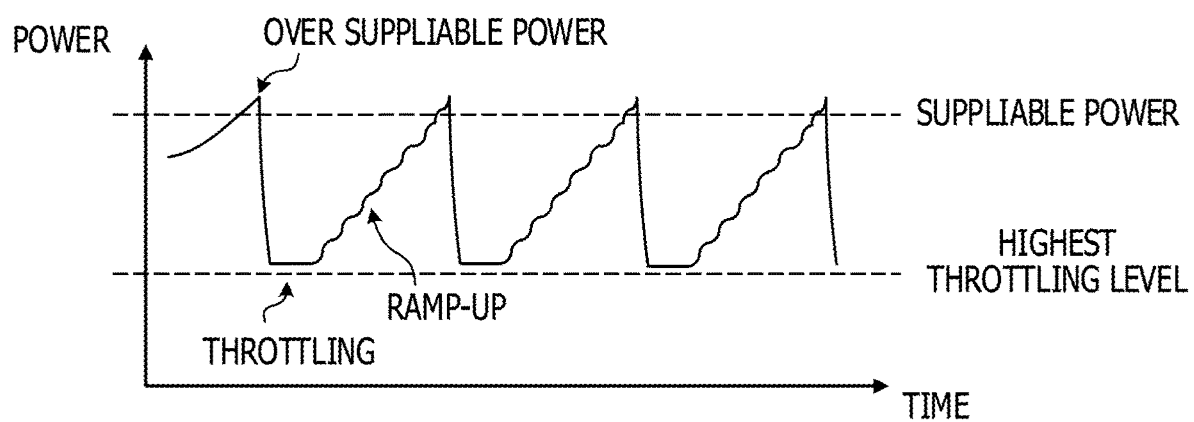
FIG. 9 is a diagram illustrating transition of power consumption in the multi-node server without the chassis manager in the related art illustrated in FIG. 8.

FIG. 4 is a diagram for explaining a method of determining allocable power when malfunction of the PSU 20 occurs in the multi-node server 1 as the example of the first embodiment. (a) of FIG. 4 illustrates a state before malfunction occurs, and (b) of FIG. 4 illustrates a state after the malfunction occurs.

In the state illustrated in (a) of FIG. 4, each of the PSUs #0 and #1 may supply power of 1000 W, and suppliable power becomes 2000 W in total. Each of the nodes #0, #1, #2, and #3 is in operation (during power-on), and power consumption of each of the nodes #0, #1, #2, and #3 is 250 W, 250 W, 1000 W, and 0 W. The node #3 is at an unused state (during power-off). Power consumption of the FAN or the like 40 is 200 W.

In the following, an example in which one PSU 20 of two PSUs 20 included in the multi-node server 1 malfunctions and supply power is insufficient will be described.

In the state illustrated in (b) of FIG. 4, malfunction occurs in the PSU #1, and as a result, 1000 W to be supplied by the PSU #0 becomes suppliable power in total after the malfunction occurs.

In this case, in the BMCs 14 of the nodes #0 to #2 in operation, each of the power controllers 102 first suppresses power consumption by dropping a clock of the CPU 141 of the own node 10 to a minimum level.

Thereafter, each of the power controllers 102 calculates power consumption of the own node 10, that is, allocation power per node, according to the following (process 1) to (process 4).

Power consumption recorded by the power recording unit 103 in each of the nodes 10 is obtained from the housing storage area 30 (process 1).

Power which may be allocated to the node 10 is calculated (process 2).

In the multi-node server 1, in addition to the node 10 in operation, the FAN or the like 40 also consumes power.

The power controller 102 obtains power consumed by the FAN or the like 40 by subtracting a sum of power consumptions of the respective nodes 10 from power consumption of the entire housing 2. Hereinafter, the power consumed by the FAN or the like 40 may be referred to as "other power consumption". It is desirable to calculate "other power consumption" in advance in a state (a normal operation state) in which malfunction is not detected in any of the PSUs 20.

In a case where malfunction occurs in one PSU 20 (the PSU #1 in the example in FIG. 4), the power controller 102 determines power which may be allocated to all of the nodes 10 in operation (during power-on) within suppliable power from the remaining PSU 20 (the PSU #0 in the example in FIG. 4) by the following equation (1).

$$\text{"allocable power"}=\text{"suppliable power after malfunction"}-\text{"other power consumption"} \quad (1)$$

In the example illustrated in (a) of FIG. 4, "suppliable power after malfunction"=1000 W, and "other power consumption"=200 W. Therefore, the power which may be allocated to all of the nodes 10 during power-on is as follows.

"allocable power"=1000 W−200 W=800 W

Calculation of Power Allocated to Each of the Nodes (Process 3)

The power controller 102 sets a value obtained by distributing the allocable power to the nodes 10 during power-on as allocation power to each of the nodes 10. The power distribution among the nodes 10 is performed for each of the nodes 10 of which power consumption information is normally updated in the housing storage area 30 during power-on, and is determined based on a ratio of power consumptions of these nodes 10. Therefore, the power controller 102 obtains allocation power to the own node 10.

For example, the power controller 102 determines suppliable power to each of the nodes by proportionally distributing (proportionally dividing) the allocable power according to the power consumption of each of the nodes before malfunction occurs.

For this reason, the power controller 102 has an updating determination function of determining whether or not power consumption information is a normally updated value in the housing storage area 30. In a case where it is determined that the power consumption information is not a normally updated value, it is considered that a node 10 corresponding to the power consumption information does not normally operate. The power controller 102 excludes the power consumption information from the processing target, and handles the node 10 corresponding to the power consumption information as not being the node 10 in operation.

A method of determining whether power consumption information in the housing storage area 30 is a normally updated value will be described below.

In the example illustrated in (a) and (b) of FIG. 4, the nodes #0 to #2 are power allocation targets (distribution targets), and the node #3 is not a power allocation target.

In the example illustrated in (a) of FIG. 4, a ratio of power consumptions per node at the nodes #0 to #2 during power-on is as follows.

node #0:node #1:node #2=250 W:250 W:1000 W=1:1:4

Based on this ratio, when 800 W which is "allocable power" is distributed to the nodes #0 to #2 during power-on, the following result is obtained.

node #0:node #1:node #2=133 W:133 W:533 W

Based on the obtained allocation power, the power controller 102 obtains allocation power distributed to the own node 10.

The power controller 102 gradually releases a throttle of the CPU 141 in the own node 10 so as to gradually increase power consumption up to the allocation power to the own node 10 calculated as described above (process 4).

Next, the method in which the power controller 102 determines whether power consumption information in the housing storage area 30 is a normally updated value will be described.

Writing to the housing storage area 30 is performed only in a state in which the node 10 is mounted on the housing 2. An initial value of the housing storage area 30 is an undefined value.

If the power controller 102 calculates allocation power per node according to the above-described method using information other than power consumption information correctly recorded by a power control mode of the node 10, the incorrect value is used for the calculation, so that an incorrect calculation result is obtained.

For this reason, in the multi-node server 1, it is important to determine whether power consumption information for the corresponding node 10 is an incorrect value for the node 10 not mounted in the housing 2 or an updated normal value by the node 10 mounted on the housing 2, for example.

For example, the power controller 102 determines whether or not each of the nodes 10 is powered on by using any one of the following methods (i) to (iii) based on the update determination information recorded in the housing storage area 30.

(i) Method Using Time Stamp

When reading power consumption information from the housing storage area 30, the power controller 102 reads a time stamp (update time information) attached to the power consumption information.

The power controller 102 compares time information (a current time) included in the own node 10 with the time stamp (the update time information) attached to the power consumption information. As a result of the comparison, in a case where a time of the time stamp and the current time of the own node 10 are separated by a predetermined threshold value or more, it may be determined that the power consumption information is not normally updated (not updated).

For example, in a state in which the power recording unit 103 is set to update power consumption information of the housing storage area 30 every one second, in a case where the power consumption information is not updated for 10 seconds or more, it may be determined that the power consumption information is not normally updated.

(ii) Method Using Check-Sum

When reading power consumption information from the housing storage area 30, the power controller 102 reads a check-sum (update time information and error detection information) attached to the power consumption information.

The power controller 102 generates a check-sum based on the power consumption information read from the housing storage area 30 and compares the generated check-sum with the check-sum attached to the power consumption information recorded in the housing storage area 30. As a result of the comparison, in a case where the check-sum generated by the power controller 102 and the check-sum read from the housing storage area 30 do not coincide with each other, it may be determined that the power consumption information is not normally updated (not updated). For example, it is considered that a value of the power consumption information read from the housing storage area 30 remains an initial value which is an undefined value.

(iii) Method Using Change in Power Consumption Information

The power controller 102 repeatedly reads out power consumption information from the housing storage area 30 a plurality of times at predetermined intervals (for example, every one second). The power consumption information is continuously read for a predetermined time.

Due to a characteristic of power, power consumption hardly has the same value all the time. In a case where a value of the power consumption information read the plurality of times does not change within the predetermined time, that is, in a case where the value indicates the same value each time, it may be determined that the power consumption information is not normally updated (not updated).

Among these methods (i) to (iii), at least two or more methods may be used in combination. For example, the method (iii) may be used as a substitute in a case where the method (i) or the method (ii) may not be used. For example, in a case where only power consumption information is read and update determination information (a time stamp and a check-sum) is not read from the housing storage area 30, the method (iii) may be used.

In a case where the power controller 102 determines that power consumption information of the housing storage area 30 is not updated by the determination method described above, the power controller 102 regards the node 10 as a power-off state and excludes the corresponding node 10 from a distribution target of allocation power.

(B) Operation

A method of obtaining power in the multi-node server 1 as an example of the first embodiment configured as described above will be described with reference to (a) and (b) of FIG. 5. (a) of FIG. 5 illustrates a process of the multi-node server 1 in a normal state. (b) of FIG. 5 illustrates a process when malfunction occurs and a power shortage occurs in the PSU #1, that is, at a time of the power shortage in the multi-node server 1.

For convenience, FIG. 5 illustrates one node 10 (BMC 14) among the plurality of nodes 10 (BMCs 14) included in the multi-node server 1.

First, a process of the multi-node server 1 in the normal state according to the first embodiment, that is, in a state in which a power shortage does not occur will be described.

As illustrated in (a) of FIG. 5, in the normal state, in the BMC 14 of the node 10, the power monitoring unit 101 obtains total power consumption of the multi-node server 1 from each of the PSUs #0 and #1 (arrows C1 and C2). The power monitoring unit 101 obtains power consumption of the own node 10.

The power recording unit 103 obtains the total power consumption and the power consumption of the own node 10 obtained from the power monitoring unit 101 as power consumption information (see arrow C3). The power recording unit 103 records the obtained power consumption information and update determination information in the storage area 30 (see arrow C4).

The above process is performed periodically (for example, every one second) in the multi-node server 1.

Next, a process in a state in which a power shortage occurs in the multi-node server 1 according to the first embodiment will be described.

In the multi-node server 1, if malfunction occurs in the PSU 20 (the PSU #1 in the example illustrated in FIG. 5), the PSU #0 notifies the BMC 14 (the power controller 102) in each of the nodes 10 of the occurrence of a power shortage (see arrow C5).

In each of the nodes 10 receiving the notification, the power controller 102 drops a clock of a CPU in the own node to a minimum level so as to suppress power consumption (throttling: see arrow C6).

Thereafter, the power controller 102 obtains the power consumption information and the update determination information from the storage area 30 (see arrow C7). For example, the power controller 102 obtains the power consumption information and the update determination information recorded by the power recording unit 103 in each of the nodes 10, from the housing storage area 30.

The power controller 102 calculates allocation power to each of the nodes by using the obtained power consumption information and update determination information.

For example, the power controller 102 determines allocation power to each of the nodes 10 by obtaining allocable power of all of the nodes 10 in operation and distributing the allocable power to the nodes 10 during power-on according to a ratio of power consumptions of the nodes 10 (see arrow C8).

Thereafter, the power controller 102 gradually releases a throttle of the CPU in the own node so as to increase power consumption until the power consumption reaches allocation power to the own node 10 (ramp up: see arrow C9).

(C) Effect

In this manner, according to the multi-node server 1 as one example of the first embodiment, it is possible to autonomously control power consumption in each of the nodes 10 without a management apparatus (a chassis manager) which manages power supply to the plurality of nodes 10. Since it is possible not to provide the chassis manager from the configuration, a manufacturing cost and an operating cost may be reduced.

In the BMC 14 in each of the nodes 10 included in the multi-node server 1, the power recording unit 103 records the total power consumption of the housing 2 and the power consumption information and the update determination information indicating power consumption of the own node 10 obtained by the power monitoring unit 101, in the housing storage area 30.

Therefore, the power consumption information and the update determination information for each of the nodes 10 may be shared by the plurality of nodes 10 (the BMCs 14) in the housing 2.

When malfunction occurs in any one of the PSUs 20, after dropping a clock of a CPU of the own node to a minimum level so as to suppress power consumption, the power controller 102 in each of the BMCs 14 determines allocation power to each of the nodes 10 by using the power consumption information and the update determination information obtained from the housing storage area 30.

At this time, by subtracting "other power consumption information" by the FAN or the like 40 from the power consumption of the entire housing 2, the power controller 102 may easily obtain allocable power to the plurality of nodes 10 in operation within power to be supplied from the remaining PSU 20.

The power controller 102 determines allocation power to each of the nodes 10 by distributing the allocable power to the plurality of nodes 10 in operation to the nodes 10 during power-on according to a ratio of power consumptions of the nodes 10 during normal operation. Therefore, it is possible to distribute power to the plurality of nodes 10 in the multi-node server 1 according to the operating status of each of the nodes 10, and to perform efficient power distribution.

Thereafter, the power controller 102 gradually releases a throttle of the CPU in the own node so as to perform an operation of increasing power supply until the power consumption reaches allocation power to the own node 10.

In this manner, for the own node 10, by supplying power within a range not exceeding the allocation power to the own node 10, the power controller 102 may perform stable power supply without overloading the remaining PSU 20.

(II) Description of Second Embodiment

In the multi-node server 1 according to the first embodiment, the power controller 102 calculates allocation power to each of the nodes 10 based on a power consumption ratio among the plurality of nodes 10 before malfunction occurs in the PSU 20. In this case, in a case where there is a node 10 in an idle state before the malfunction occurs in the PSU 20, power allocated after the malfunction of the PSU 20 may decrease below operable power of the own node 10.

In the multi-node server 1 as one example of a second embodiment, by using desired minimum power consumption of each of the nodes 10, the amount of power supplied to each of the nodes 10, in a case where malfunction occurs in any one of the PSUs 20, is controlled not to decrease below the desired minimum power consumption of each of the nodes 10.

For example, since each of the nodes 10 does not operate at power equal to or less than desired minimum power, the power controller 102 secures the desired minimum power in each of the nodes 10 so that allocation power to each of the nodes 10 does not decrease below the desired minimum power consumption of the corresponding node 10.

Specifically, in the multi-node server 1 according to the second embodiment, the power recording unit 103 in the BMC 14 of each of the nodes 10 writes the desired minimum power of the own node 10 in the housing storage area 30 in addition to power consumption information and the update determination information.

The desired minimum power of the node 10 may use, for example, power consumption at a time of throttling. The desired minimum power of the node 10 may be obtained by adding required minimum power consumption of each component included in the multi-node server 1, and may be obtained by using various known methods.

When calculating allocation power to each of the nodes 10, the power controller 102 obtains a total (hereinafter, total desired minimum power consumption of nodes) of desired minimum power consumptions of the nodes 10 and calculates a power amount as ratio-distributable power consumption by subtracting the total desired minimum power consumption of nodes from allocable power to the node 10 during power-on.

The power controller 102 determines allocation power to each of the nodes 10 by distributing the ratio-distributable power consumption to the node 10 during power-on according to a ratio of power consumptions of the nodes 10.

Except for parts other than the processes by the power monitoring unit 101, the power controller 102, and the power recording unit 103 described below, the multi-node server 1 of the present modification is configured in the same manner as the multi-node server 1 of the embodiment described above.

FIG. 6 is a diagram for explaining a method of determining allocable power when malfunction of the PSU 20 occurs in the multi-node server 1 as an example of the second embodiment. (a) of FIG. 6 illustrates a state before malfunction occurs. (b) of FIG. 6 illustrates a state after the malfunction occurs.

In the state illustrated in (a) of FIG. 6, each of the PSUs #0 and #1 may supply power of 1000 W, and suppliable power becomes 2000 W in total. Each of the nodes #0, #1, #2, and #3 is in operation (during power-on), and power consumption of each of the nodes #0, #1, #2, and #3 is 250 W, 250 W, 1000 W, and 0 W. The node #3 is at an unused state (during power-off). Power consumption of the FAN or the like 40 is 200 W.

Desired minimum power consumption of each of the nodes #0, #1, #2, and #3 is 150 W, 150 W, 300 W, and 0 W. The node #3 is not used.

In the following, an example in which one PSU 20 of two PSUs 20 included in the multi-node server 1 malfunctions and supply power is insufficient will be described.

In the state illustrated in (b) of FIG. 6, malfunction occurs in the PSU #1, and as a result, 1000 W to be supplied by the PSU #0 becomes suppliable power in total after the malfunction occurs.

In this case, in the BMCs 14 of the nodes #0 to #2 in operation, each of the power controllers 102 first suppresses power consumption by dropping a clock of the CPU 141 of the own node 10 to a minimum level.

Thereafter, each of the power controllers 102 calculates power consumption of the own node 10, that is, allocation power per node, according to the following (process 11) to (process 16).

Power consumption and desired minimum power consumption recorded by the power recording unit 103 of each of the nodes 10 is obtained from the housing storage area 30 (process 11).

Power which may be allocated to the node 10 is calculated (process 12).

The power controller 102 obtains power ("other power consumption") consumed by the FAN or the like 40 by subtracting a sum of power consumptions of the respective nodes 10 from power consumption of the entire housing 2.

In a case where malfunction occurs in one PSU 20 (the PSU #1 in the example in FIG. 6), the power controller 102 determines power available to the entire node 10 in operation (during power-on) within suppliable power from the remaining PSU 20 (the PSU #0 in the example in FIG. 6) by the following equation (1).

"allocable power"="suppliable power after malfunction"−"other power consumption" (1)

In the example illustrated in (a) of FIG. 6, "suppliable power after malfunction"=1000 W, and "other power consumption"=200 W. Therefore, the power which may be allocated to the nodes 10 during power-on is as follows.

"allocable power"=1000 W−200 W=800 W

Calculation of Total Desired Minimum Power Consumption of Nodes (process 13)

The power controller 102 calculates total desired minimum power consumption of nodes by summing up desired minimum power consumptions of the respective the nodes 10.

In the example illustrated in (a) of FIG. 6, the desired minimum power consumption of each of the nodes #0, #1, #2, and #3 is 150 W, 150 W, 300 W, and 0 W, and total desired minimum power consumption of nodes is calculated by the following equation.

"total desired minimum power consumption of nodes"=150 W+150 W+300 W=600 W

Power which may be ratio-distributed to the nodes 10 is calculated (process 14).

The power controller 102 calculates power (ratio-distributable power consumption:distribution target power) which may be distributed to all of the nodes 10 in operation (during power-on) by subtracting "total desired minimum power consumption of nodes" from "allocable power".

In the example illustrated in (a) of FIG. 6, ratio-distributable power consumption is calculated by the following equation (2).

"ratio-distributable power consumption"="allocable power"−"total desired minimum power consumption of nodes" (2)

=800 W−600 W=200 W

Calculation of A Distribution Amount of Ratio-distributable Power Consumption (Process 15)

The power controller 102 calculates a distribution amount for each of the nodes 10 so as to distribute the ratio-distributable power consumption obtained as described above to each of the nodes 10 which are powered on and of which power consumption information is normally updated in the housing storage area 30. The distribution amount 10 is calculated based on a ratio of power consumptions of the nodes 10 which are powered on and of which power consumption information is normally updated in the housing storage area 30.

In the example illustrated in FIGS. 6A and 6B, the nodes #0 to #2 are power allocation targets (distribution targets), and the node #3 is not a power allocation target.

In the example illustrated in (a) of FIG. 6, a ratio of allocation powers per node at the nodes #0 to #2 during power-on is as follows.

node #0:node #1:node #2=250 W:250 W:1000 W=1:1:4

Based on this ratio, when 200 W which is "ratio-distributable power consumption" is distributed to the nodes #0 to #2 during power-on, distribution power to each of the nodes 10 is obtained.

For example, the power controller 102 determines proportionally distributable power by proportionally distributing (proportionally dividing) according to the power consumption of each of the nodes before malfunction occurs. Distribution power to each of the nodes 10 is as follows.

node #0:node #1:node #2=33 W:33 W:133 W

Calculation of Power Allocated to Each of the Nodes 10 (Process 16)

The power controller 102 calculates allocation power to each of the nodes 10 by adding the distribution power obtained for each of the nodes 10 to the desired minimum power consumption of each of the nodes 10.

For example, as described above, since the desired minimum power consumption of each of the nodes #0, #1, and #2 is 150 W, 150 W, and 300 W, allocation power to each of the nodes 10 is obtained as the following by adding the distribution power obtained as described above to the desired minimum power consumption.

node #0: 150 W+33 W=183 W node #1: 150 W+33 W=183 W node #2: 300 W+133 W=433 W node #3: 0 W Based on the obtained allocation power, the power controller 102 obtains allocation power distributed to the own node 10.

In this manner, according to the multi-node server 1 as the second embodiment of the present disclosure, it is possible to obtain the same effects as those of the first embodiment described above. Further, even in a case where malfunction occurs in some of the PSUs 20, the power allocated to each of the nodes 10 does not decrease below the desired minimum power consumption of the corresponding node 10, so that each of the nodes 10 may stably operate.

(III) Others

The disclosed technology is not limited to the above-described embodiment, and various modifications may be made without departing from the spirit of the present embodiment. The configurations and processes of the present embodiment may be selected as desired, or may be combined as appropriate.

For example, in each of the embodiments described above, although the example in which two PSUs 20 are included in the multi-node server 1 is described, the embodiment is not limited to this, and three or more PSUs 20 may be included.

In this manner, in a case where three or more PSUs 20 are provided and malfunction or the like occurs in some of the PSUs 20, the power controller 102 of each of the nodes 10 determines allocation power so as to distribute total suppliable power from the remaining PSU 20 to the nodes 10 in operation.

In addition, in each of the embodiments described above, although the example in which four nodes 10 are included in the multi-node server 1 is described, the embodiment is not limited to this, and three or fewer nodes 10 or five or more nodes 10 may be included.

Further, in each of the embodiments described above, although the example of using a check-sum generated based on power consumption information recorded in the housing storage area 30 as update determination information is described, the embodiment is not limited to this. For example, information other than the check-sum may be used as error detection information. For example, as update determination information, a hash value calculated by applying a hash function to power consumption information may be used, or various modifications may be made and executed.

For example, in a case where malfunction occurs in the PSU 20 before the power recording unit 103 records power consumption information and the like in the housing storage area 30, the BMC 14 reduces a clock of the CPU 11 of the own node 10 by throttling so as to decrease power consumption, and then performs ramp-up of gradually increasing the power consumption.

During the ramp-up, the power recording unit 103 stores power consumption information, update determination information, or the like in the housing storage area 30. Thereafter, in a case where the PSU 20 notifies an abnormality in supply power, by using the power consumption information or the update determination information stored in the housing storage area 30, it is possible to realize control of each of the embodiments described above.

Further, it is possible for a person skilled in the art to execute and manufacture the present embodiment by the disclosure described above.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A server apparatus comprising:
- a plurality of nodes;
- a plurality of power supply devices configured to supply power; and
- a shared memory from and to which reading and writing from each of the plurality of nodes are performed,
- each of the plurality of nodes includes a processor configured to:
  - store power consumption information of an own node in the memory;
  - read the power consumption information from the memory when an abnormality is detected in some power supply devices among the plurality of power supply devices;
  - control supply power from a normal power supply device, in which an abnormality is not detected among the plurality of power supply devices, to the own node, based on the read power consumption information;
  - calculate distribution power per node by distributing distribution target power, obtained by subtracting a sum of desired minimum power consumptions of the respective nodes in operation from suppliable power suppliable from the normal power supply device, to the nodes in operation according to a ratio of power consumptions of the nodes in operation; and determine supply power to the node by adding the calculated distribution power to the desired minimum power consumption of each of the nodes.

2. The server apparatus according to claim 1, wherein the processor is configured to determine supply power to the node by distributing suppliable power suppliable from the normal power supply device to the nodes in operation according to a ratio of power consumptions of the nodes in operation.

3. The server apparatus according to claim 2, wherein the processor is configured to:

store, when storing the power consumption information in the memory, time information indicating a time of the storing in the memory; and handle a node corresponding to the power consumption information as not being a node in operation when a time difference between a value indicating the time information read from the memory and a current time is equal to or larger than a threshold value.

4. The server apparatus according to claim 2, wherein the processor is configured to:

store, when recoding the power consumption information in the memory, error detection information generated based on the power consumption information in the memory; and handle a node corresponding to the power consumption information as not being a node in operation when the error detection information read from the memory and the error detection information generated based on the power consumption information read from the memory do not coincide with each other.

5. The server apparatus according to claim 2, wherein the processor is configured to:

repeatedly read the time information from the memory at predetermined intervals; and handle a node corresponding to the power consumption information as not being a node in operation when a value of the read time information does not change.

6. A non-transitory computer-readable storage medium storing a program that causes a processor includes in each of a plurality of nodes to execute a process, the process comprising:

storing power consumption information of an own node in a shared memory from and to which reading and writing from each of the plurality of nodes are performed;

reading the power consumption information from the memory when an abnormality is detected in some power supply devices among a plurality of power supply devices; and controlling supply power from a normal power supply device, in which an abnormality is not detected, among the plurality of power supply devices, to the own node, based on the read power consumption information, the controlling includes:

calculating distribution power per node by distributing distribution target power, obtained by subtracting a sum of desired minimum power consumptions of the respective nodes in operation from suppliable power suppliable from the normal power supply device, to the nodes in operation according to a ratio of power consumptions of the nodes in operation; and determining supply power to the node by adding the calculated distribution power to the desired minimum power consumption of each of the nodes.

7. The storage medium according to claim 6, wherein the controlling includes determining supply power to the node by distributing suppliable power suppliable from the normal power supply device to the nodes in operation according to a ratio of power consumptions of the nodes in operation.

8. The storage medium according to claim 7, wherein the storing includes storing time information indicating a time of the storing in the memory when storing the power consumption information in the memory; and the controlling includes handling a node corresponding to the power consumption information as not being a node in operation when a time difference between a value indicating the time information read from the memory and a current time is equal to or larger than a threshold value.

9. A monitoring control apparatus included in each of a plurality of nodes in a server system including the plurality of nodes and a plurality of power supply devices that supply power, the monitoring control apparatus comprising:

a hardware interface; and a processor coupled to the hardware interface and configured to:

store power consumption information of an own node in a shared memory from and to which reading and writing from each of the plurality of nodes are performed, via the hardware interface;

read the power consumption information from the memory when an abnormality is detected in some power supply devices among the plurality of power supply devices;

control supply power from a normal power supply device, in which an abnormality is not detected among the plurality of power supply devices, to the own node, based on the read power consumption information;

calculate distribution power per node by distributing distribution target power, obtained by subtracting a sum of desired minimum power consumptions of the respective nodes in operation from suppliable power suppliable from the normal power supply device, to the nodes in operation according to a ratio of power consumptions of the nodes in operation; and determine supply power to the node by adding the calculated distribution power to the desired minimum power consumption of each of the nodes.

* * * * *